US011866287B2

(12) United States Patent
Koyanagi

(10) Patent No.: US 11,866,287 B2
(45) Date of Patent: Jan. 9, 2024

(54) SHEET FEEDING DEVICE AND AN IMAGE FORMING APPARATUS WITH A SHEET FEEDING DEVICE

(71) Applicant: CANON KABUSHIKI KAISHA, Tokyo (JP)

(72) Inventor: Noriaki Koyanagi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 17/347,790

(22) Filed: Jun. 15, 2021

(65) Prior Publication Data

US 2022/0002102 A1 Jan. 6, 2022

(30) Foreign Application Priority Data

Jul. 3, 2020 (JP) ................................. 2020-115350

(51) Int. Cl.

*B65H 5/36* (2006.01)
*B65H 85/00* (2006.01)
*B65H 5/06* (2006.01)
*G03G 15/00* (2006.01)

(52) U.S. Cl.

CPC ................. *B65H 5/36* (2013.01); *B65H 5/06* (2013.01); *B65H 85/00* (2013.01); *B65H 2513/41* (2013.01); *G03G 15/652* (2013.01)

(58) Field of Classification Search

CPC ............. B65H 5/36; B65H 5/38; B65H 85/00
See application file for complete search history.

(56) References Cited

U.S. PATENT DOCUMENTS

| | | | | |
|---|---|---|---|---|
| 5,305,995 | A | 4/1994 | Nakajima et al. | |
| 6,550,762 | B2 * | 4/2003 | Stoll | B65H 15/004 271/186 |
| 9,096,409 | B2 | 8/2015 | Koyanagi | |
| 10,289,054 | B2 | 5/2019 | Koyanagi | |
| 2018/0305152 | A1 * | 10/2018 | Sakurai | B65H 5/062 |
| 2018/0305153 | A1 * | 10/2018 | Kokubo | B65H 85/00 |
| 2018/0348691 | A1 | 12/2018 | Koyanagi | |
| 2021/0009376 | A1 | 1/2021 | Takezawa et al. | |
| 2021/0032064 | A1 * | 2/2021 | Hayashi | B65H 29/125 |

FOREIGN PATENT DOCUMENTS

| | | |
|---|---|---|
| JP | 2015-025911 A | 2/2015 |

* cited by examiner

*Primary Examiner* — Patrick Cicchino
(74) *Attorney, Agent, or Firm* — Venable LLP

(57) ABSTRACT

A sheet feeding device includes a reversing roller, a guide member and a rotatable member. The guide member includes a curved portion to curve inside a first surface of the sheet and guides the sheet along the curved portion in contact with a second surface opposite to the first surface of the sheet in a first direction. The rotatable member disposed opposed to a sheet guide surface in the curved portion with a gap and is rotated by contacting with the first surface of the sheet. When the sheet is fed by the reversing roller in a second direction, the rotatable member is rotated by contact of the first surface of the sheet with the rotatable member.

16 Claims, 10 Drawing Sheets

SHEET FEEDING DEVICE AND AN IMAGE FORMING APPARATUS WITH A SHEET FEEDING DEVICE

FIELD OF THE INVENTION AND RELATED ART

The present invention relates to a sheet feeding device that feeds sheets and to an image forming apparatus that forms an image on a sheet fed by the sheet feeding device.

Conventional sheet feeding devices are equipped with a reversing feed mechanism that reverses and feeds the sheet. The reversing feed mechanism is equipped with a pair of reversing rollers, and after feeding the sheet in the first direction, the reversing feed mechanism feeds the sheet in the second direction opposite to the first direction while holding the rear end of the sheet, so-called switchback. In Japanese Laid-Open Patent Application No. 2015-25911, when the sheet is fed in the first direction by the reversing roller pair, the guide member that guides the sheet is provided so that it is curved on the first side of the sheet and on the second side opposite the first side. However, in the above configuration, since the guide member is located inside the sheet being curved and fed, when the sheet is fed in the second direction by the reversing roller pair, the face of the sheet and the guide member come into contact. As a result, the sheet receives resistance from the guide member, which may cause the sheet to skew.

SUMMARY OF THE INVENTION

The purpose of the present invention is to provide a sheet feeding device that reduces sheet skewing when the sheet is fed in reverse.

According to an aspect of the present invention, there is provided a sheet feeding device comprising: a reversing roller configured to reverse a sheet by feeding the sheet with respect to a first direction and then feeding the sheet with respect to a second direction opposite to the first direction; a guide member including a curved portion to curve inside a first surface of the sheet and configured to guide the sheet along said curved portion in contact with a second surface opposite to the first surface of the sheet fed by said reversing roller with respect to the first direction; and a rotatable member disposed to be opposed to a sheet guide surface in said curved portion with a gap and configured to be rotated by contacting with the first surface of the sheet fed by said reversing roller, wherein when the sheet is fed by said reversing roller with respect to the second direction, said rotatable member is rotated by contact of the first surface of the sheet with said rotatable member.

Further features of the present invention will become apparent from the following description of exemplary embodiments (with reference to the attached drawings).

DESCRIPTION OF EMBODIMENTS

The following is a description of embodiments for implementing the present invention with reference to the drawings. The embodiments described below are shown by way of example, and the invention is not limited by them.

FIRST EMBODIMENT

Image Forming Apparatus

Figure 1:
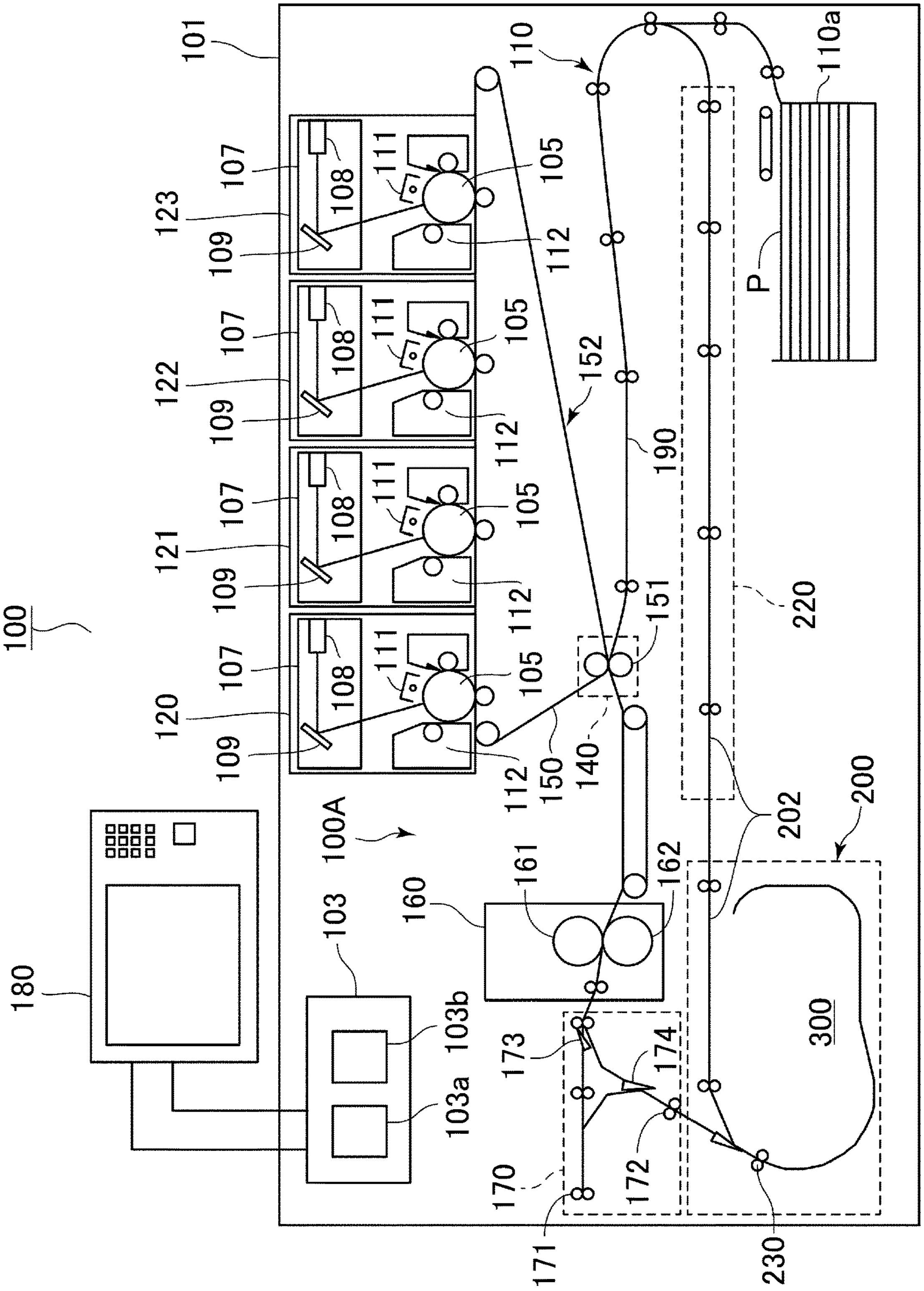
FIG. 1 is a schematic view of the image forming apparatus for the first embodiment.

First, the structure of the image forming apparatus of the first embodiment is described. FIG. 1 is a cross-sectional view showing the structure of a laser beam printer (hereinafter referred to as "printer") 100, which is the image forming apparatus of the first embodiment. The printer 100 has a casing 101, in which each mechanism constituting an engine portion and a control board storage portion 103 that stores an engine control portion 103*a* and a printer controller 103*b* are built in. The engine control portion 103*a* controls the operation of each mechanism that constitutes the engine portion. The printer controller 103*b* expands the print data received from an external computer and executes the printing job by controlling the engine control portion 103*a*.

In this embodiment, the mechanisms comprising the engine portion refer to the optical development processing mechanisms 120, 121, 122, 123, the intermediate transfer mechanism 152, the secondary transfer portion 140, the fixing processing mechanism 160, the feed conveying mechanism 110, the discharge mechanism 170, the reversing mechanism 200, and the double-sided conveying mechanism 220. The optical development processing mechanisms 120, 121, 122, 123, the intermediate transfer mechanism 152, the secondary transfer portion 140, and the fixing processing mechanism 160 constitute the tandem type and intermediate transfer type electrophotographic mechanism 100A that forms an image on a sheet.

The optical development processing mechanisms 120, 121, 122, 123 are a station that creates a monochromatic visible image (toner image) by performing the charging, exposure and development processes in the electrophotographic process. The intermediate transfer mechanism 152 is a mechanism that creates a full-color toner image by primary transferring the visible image created by the optical development processing mechanisms 120, 121, 122, 123 and carrying it on the intermediate transfer member 150. The secondary transfer portion 140 is a mechanism that transfers the toner image carried on the intermediate transfer member 150 to a sheet P, a recording material, as a secondary transfer. The fixing processing mechanism 160 applies a fixing process to the toner image transferred to the sheet P, and fixes the image on the sheet P.

The feed conveying mechanism 110 is a mechanism that feeds and conveys a sheet P toward the secondary transfer portion 140. The discharge mechanism 170 is a mechanism for discharging or sorting in the feeding direction a sheet on which an image has been formed by passing through the secondary transfer portion 140 and the fixing processing mechanism 160. The reversing mechanism 200 has a reversing and retraction portion 300 as a retreat portion to be temporarily retreated when the sheet is switched back, and is a mechanism to perform reversing feeding of the sheet P in the case of double-side printing. The double-side feeding mechanism 220 as a re-feeding means is a mechanism that feeds the sheet P in the inverted state by the reversing mechanism 200 to the secondary transfer portion 140 again.

The basic operation of the image forming apparatus is described below. Each of the laser scanner portions 107 of the optical development processing mechanism 120, 121, 122, 123 has a laser driver that turns on and off the laser beam emitted from an unshown semiconductor laser according to the image data supplied from the printer controller 103*b*. The laser beam emitted from the semiconductor laser is scanned in the main scanning direction by the rotating polygonal mirror. The laser beam swung in the main scanning direction is guided to the photosensitive drum 105 through the reflecting polygon mirror 109 to expose the photosensitive drum 105 in the main scanning direction. Meanwhile, the electrostatic latent image charged by the primary charger 111 and formed on the surface of the photosensitive drum 105 by the scanning exposure by the laser beam as described above is visualized into a toner image by the toner supplied by the developer 112.

The toner image carried on the photosensitive drum 105 is then transferred (primary transferred) to the intermediate transfer member 150 provided in the intermediate transfer mechanism 152 by applying a voltage with opposite polarity to the toner image. During color image formation, the monochromatic toner images of yellow, magenta, cyan, and black formed in each optical development processing mechanism 120-123 are sequentially transferred to the intermediate transfer member 150, and a full-color visible image is formed on the surface of the intermediate transfer member 150.

In parallel with such toner image creation operation, the feed conveying mechanism 110 separates sheets P from the sheet bundle stored in the storage 110*a* one by one and feeds them to the secondary transfer portion 140. The path from the feed conveying mechanism 110 to the discharge mechanism 170 via the secondary transfer portion 140 and the fixing processing mechanism 160 is the main conveying path 190 where image formation is performed on the sheets.

Next, the visible image carried on the surface of the intermediate transfer member 150 is transferred to the sheet P being fed by the feed conveying mechanism 110 in the secondary transfer portion 140 composed of the secondary transfer roller pair 151 (secondary transfer). The secondary transfer roller pair 151 presses the sheet P against the intermediate transfer member 150, and at the same time, a bias of opposite polarity to that of the toner is applied to perform secondary transfer.

The sheet P that has passed through the secondary transfer portion 140 is fed to the fixing processing mechanism 160. The fixing processing mechanism 160 has a heating roller 161 and a pressure roller 162 for nipping and feeding the sheet P, and a heat source (e.g., a halogen lamp) for heating the toner image on the sheet through the heating roller 161. As the sheet P passes through the fixing nip composed of the heating roller 161 and the pressure roller 162, the toner transferred to the sheet P is heated and melted, and then cooled and hardened, resulting in an image that is fixed on the sheet P.

The sheet P that has passed through the fixing processing mechanism 160 is fed to the ejection mechanism 170. In the ejection mechanism 170, the feed path of the sheet P is switched according to whether double-sided printing is performed on the sheet P or not. In the case of single-sided printing, the sheet P is guided by the first switching flap 173 toward the ejection roller pair 171 as the ejection means, and is discharged outside the printer 100 by the ejection roller pair 171.

The sheet P with an image formed on the first surface in double-sided printing is guided to the reversing entrance roller 172 by the first switching flap 173 and is fed to the reversing mechanism 200 via the reversing entrance roller 172. The reversing mechanism 200 performs switchback feeding while temporarily retreating the sheet P using the reversing and retraction portion 300, and feeds it to the double-side feeding mechanism 220.

The double-sided feeding mechanism 220 joins the feed conveying mechanism 110 upstream from the secondary transfer portion 140, and feeds the sheet P, whose first and second sides have been switched by the reversing mechanism 200, back to the feed conveying mechanism 110. The sheet P switched back by the reversing mechanism 200 is fed again by the reversing mechanism 200 and the double-sided feeding mechanism 220 toward the main feeding path 190. After an image is formed on the second side by the sheet P passing through the secondary transfer portion 140 and the fixing processing mechanism 160, the sheet P is now guided to the ejection roller pair 171 and is ejected outside the printer 100 by the ejection roller pair 171.

For the sheet P used as the recording material, various types of sheets can be used, such as general plain paper, recycled paper, glossy paper, coated paper (paper with surface treatment such as resin coating), thin paper, and thick paper. In addition, in this embodiment, a long sheet whose length in the feeding direction is longer than the general regular size (for example, a sheet longer than 420 mm, which is the longest side of an A3 sheet) can be used as the recording material. The long sheets may not necessarily be stored in the storage 110*a* shown in the figure, but may, for example, be set in a manual feed tray protruding from the side of the casing 101, and fed one by one by a feed roller to the feed conveying mechanism 110.

The printer 100 is also provided with an operation portion 180 that serves as a user interface. The operation portion 180 has a display device such as an LCD panel that displays information to the user, and an input device such as physical keys or a touch panel function of the LCD panel that enables the user to input commands and data to the printer 100. The user can change, for example, the setting of whether the sheet to be used for the current print job is a long sheet or not by operating the operation unit 180. The printer controller 103*b* as control means executes the print job by controlling the engine control portion 103*a* based on the information received from the operation portion 180.

The tandem and intermediate transfer type electrophotographic mechanism 100A (optical development processing mechanism 120, 121, 122, 123, intermediate transfer mechanism 152, secondary transfer portion 140, fixing processing mechanism 160) described above is an example of an image forming mechanism that forms images on sheets. In applying the technology described below, for example, an electrophotographic mechanism of the direct transfer method, in which the toner image formed on the photoconductor is transferred to the sheet without going through the intermediate transfer member, may be used as the image forming means. In addition, not only electrophotographic mechanisms, but also inkjet printing units and offset printing mechanisms may be used as image forming means.

Reversing Mechanism

Figure 2:
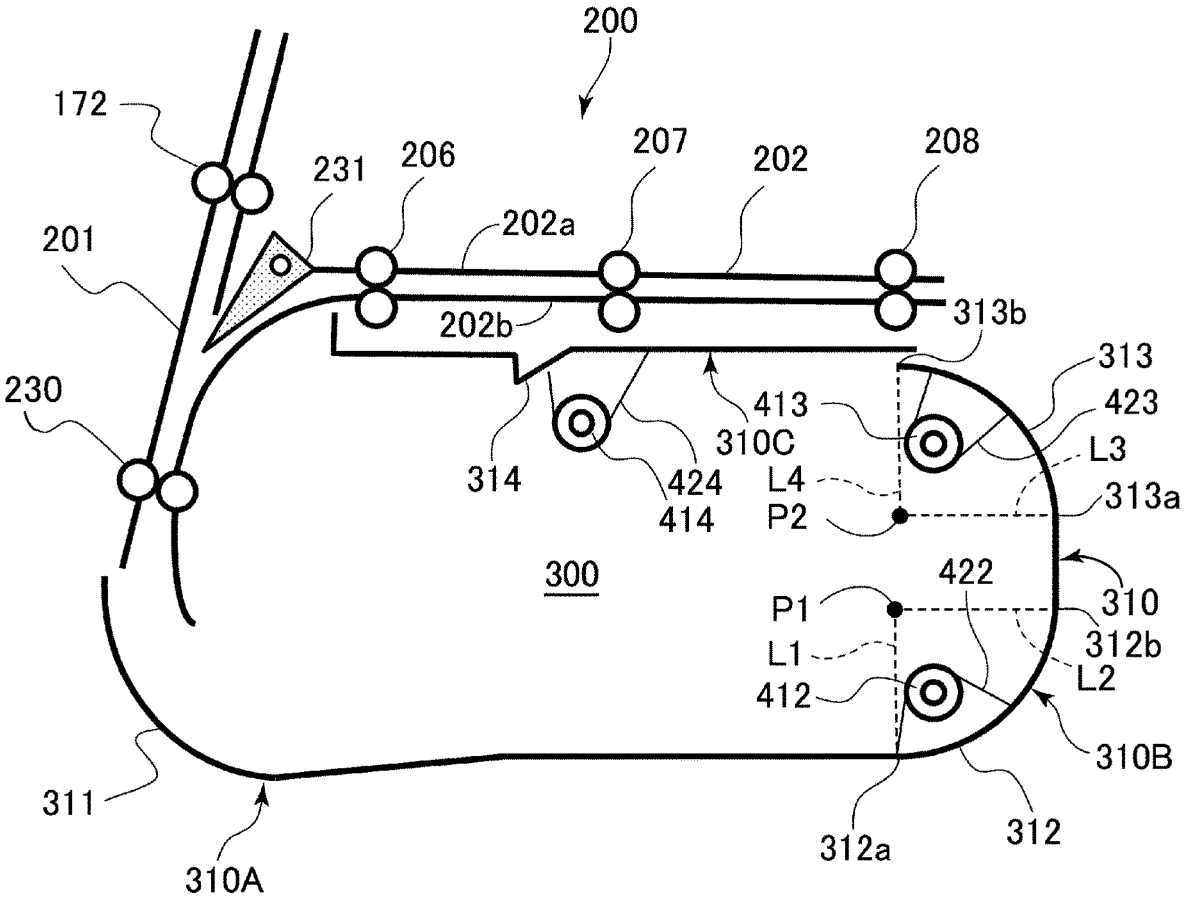
FIG. 2 is a schematic view of the reversing mechanism for the first embodiment.

Next, the reversing mechanism 200 is described. FIG. 2 shows a schematic view of the area around the reversing mechanism 200 from the front of the main assembly. The reversing mechanism 200 is equipped with an upstream feeding path 201, a double-sided feeding path 202, a reversing roller pair 230, a double-sided switching flap 231, a reversing and retraction portion 300, and double-sided feeding rollers 206, 207. The upstream feeding path 201 is a part of the above second feeding path through which the sheet guided by the first switching flap 173 (FIG. 1) to the reversing entrance roller 172 passes. The double-sided feeding path 202 is formed by the top guide 202*a* and the bottom guide 202*b*, and is connected to the main feeding path 190 through the double-sided feeding mechanism 220 to the meeting portion with the main feeding path 190.

The reversing roller pair 230 as reversing means is provided downstream (downward with respect to the vertical direction) from the place where the upstream feeding path 201 and the double-sided feeding path 202 meet with respect to the feeding direction in the upstream feeding path 201. The reversing roller pair 230 is configured to switch the sheet feeding direction, for example, by being driven and connected to a motor capable of forward and reverse rotation. The motor is controlled by the above-mentioned printer controller 103*b*, that is, the drive of the reversing roller pair 230 is freely controlled. In other words, the above printer controller 103*b* can control the sheet feeding speed by the reversing roller pair 230 and the acceleration of the sheet from the stationary state to the feeding speed.

The double-sided switching flap 231 is provided at the place where the upstream feeding path 201 and the double-sided feeding path 202 meet, and restricts that the sheet reversed by the reversing roller pair 230 is fed back into the upstream feeding path 201.

The double-sided feeding path 202 is provided with double-sided feeding rollers 206, 207, and 208. The double-sided feeding rollers 206, 207, and 208, which are the feeding means of this embodiment, convey sheets that are reversed by the reversing roller pair 230 and fed into the double-sided feeding path 202 toward the double-sided feeding mechanism 220 via the double-sided feeding path 202.

The reversing and retraction portion 300 as a retraction portion is provided downstream of the reversing roller pair 230 with respect to the feeding direction in the upstream feeding path 201. The reversing and retraction portion 300 forms a retreat area for temporarily retreating a part of the sheet when the reversing roller pair 230 switches back the sheet.

In the present embodiment, as shown in FIG. 1, the main feeding path 190 and the double-sided feeding path 202 both extend in a horizontal direction, and in the range shown in FIG. 2, the double-sided feeding path 202 also extends from one side (left side in the figure) to the other side (right side in the figure) in the horizontal direction. With respect to the vertical direction, the double-sided feeding path 202 is located below the main feeding path 190, and the reversing and retraction portion 300 is located below the double-sided feeding path 202. In the present embodiment, the fixing processing mechanism 160 and the ejection mechanism 170, both of which are located above the reversing and retraction portion 300, are in an arrangement that overlaps at least partially with the reversing and retraction portion 300 when viewed in the vertical direction. In addition, the reversing and retraction portion 300 and the storage unit 110*a* are arranged horizontally side by side, and their occupied areas in the vertical direction overlap. Such an arrangement is effective in suppressing the enlargement of the printer 100 due to the arrangement of the reversing and retraction portion 300.

Figure 3:
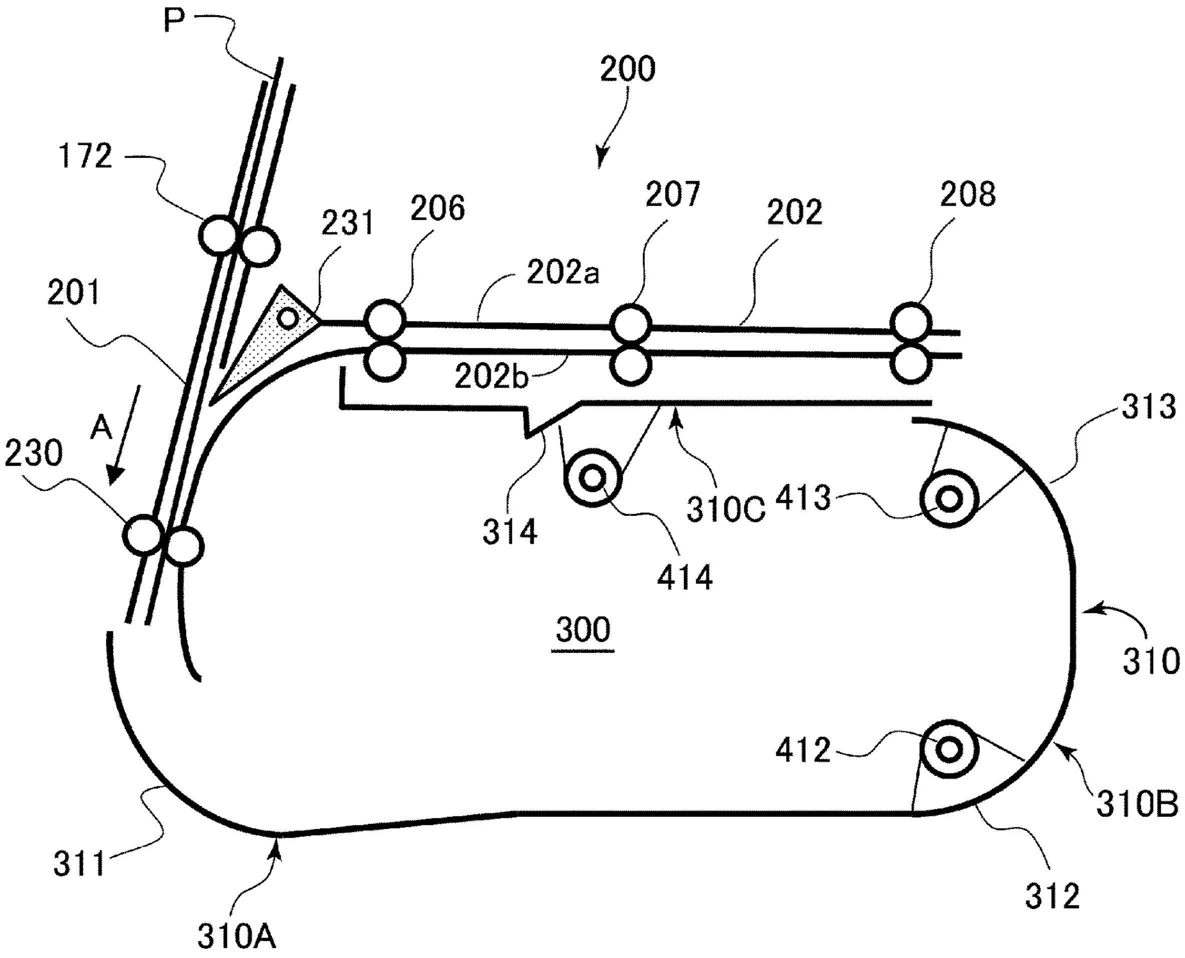
FIG. 3 is a view showing the state of the sheet before the reversal of the reversing operation by the reversing mechanism of the first embodiment.
Figure 4:
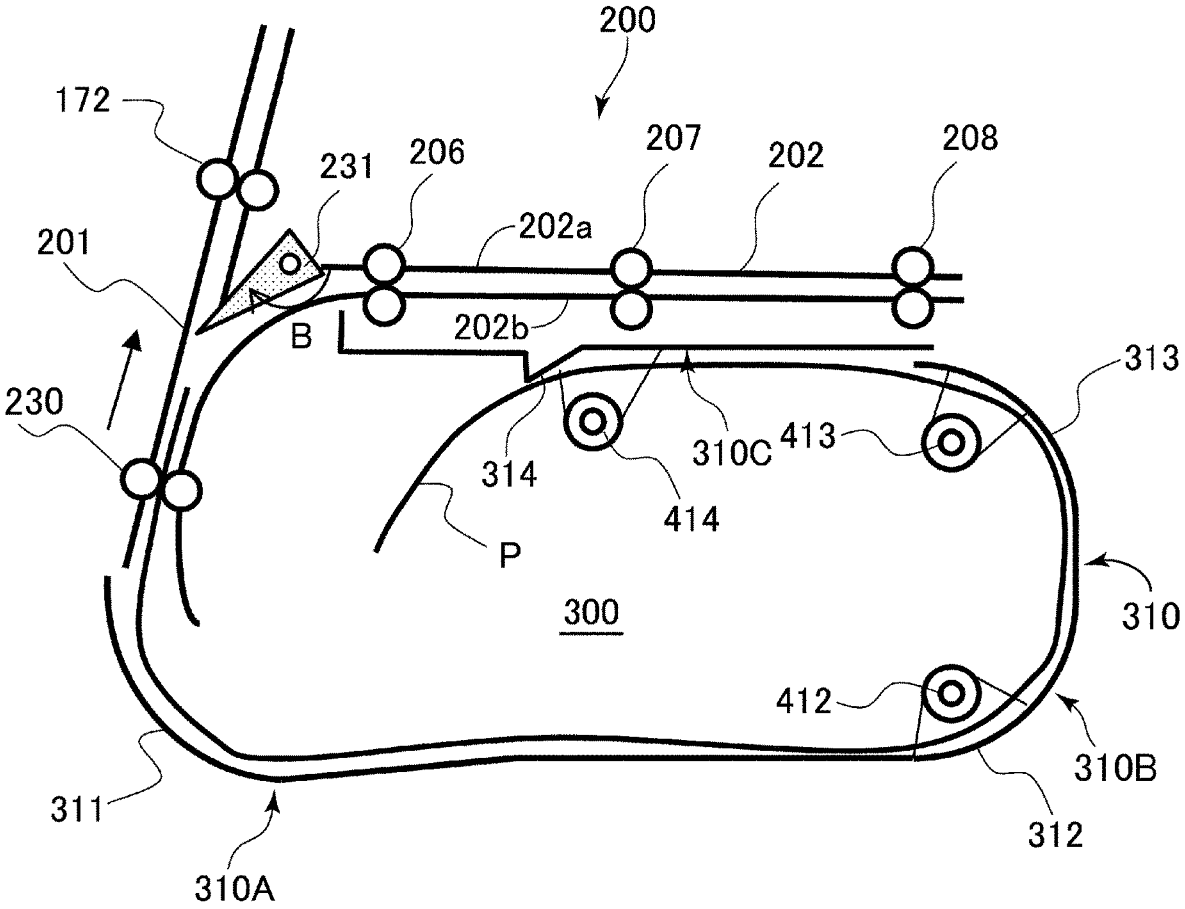
FIG. 4 is a view showing the state of the sheet during the reversal of the reversing operation by the reversing mechanism of the first embodiment.
Figure 5:
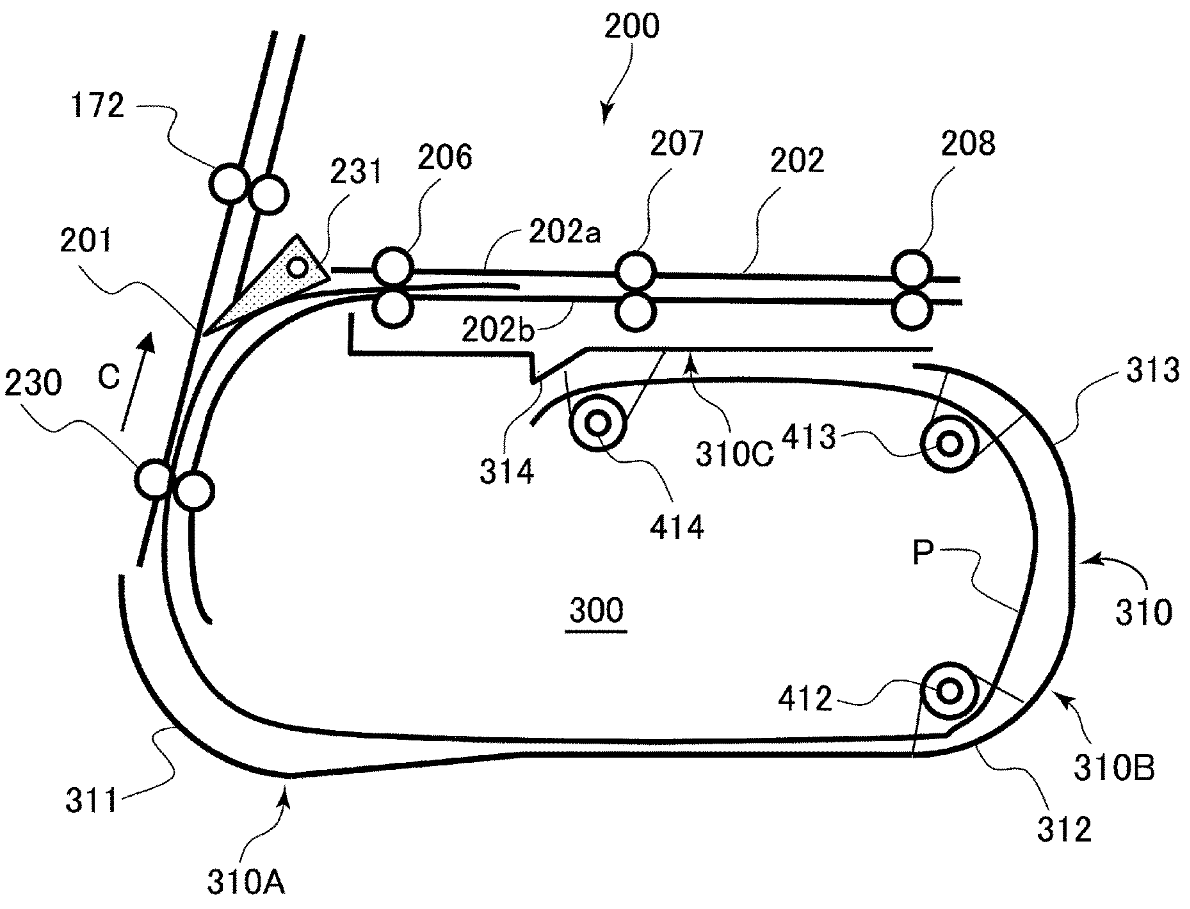
FIG. 5 is a view showing the state of the sheet after the reversal of the reversing operation by the reversing mechanism of the first embodiment.

FIG. 3, FIG. 4, and FIG. 5 are schematic views of the operation of the sheet P in the reversing mechanism 200, showing the state of the sheet before reversing, the state of the sheet during reversing, and the state of the sheet after reversing, respectively.

The sheet P (dotted line) with an image formed on the first surface fed from the reversing entrance roller 172 to the reversing mechanism 200 is fed through the upstream feeding path 201 and delivered to the reversing roller pair 230 (FIG. 3). The reversing roller pair 230 continues to convey the sheet P in the forward direction A (the first direction) when it receives the sheet P from the reversing entrance roller 172. At this time, the portion of the sheet P that is fed in the forward direction A from the reversing roller pair 230 is stored in the reversing and retraction portion 300 and is retreated.

When the rear end of the sheet P in the forward direction A passes through the double-sided switching flap 231, the reversing roller pair 230 temporarily stops. Thereafter, the direction of the double-sided switching flap 231 is switched so that it is rotated in the direction of arrow B, and the reverse flow of the sheet P in the upstream feeding path 201 is restricted and guided to the double-sided feeding path 202 (FIG. 4). After the direction of the double-sided switching flap 231 is switched, the reversing roller pair 230 switches the feeding direction to the reverse direction C (second direction) and feeds the sheet P. As a result, the sheet P is brought into the double-sided feeding path 202 and is fed by the double-sided feeding rollers 206 and 207 (FIG. 5).

In the above, we have described the case where the sheet that has been reversed by the reversing mechanism 200 is fed through the double-sided feeding path 202, but the reversing mechanism 200 can also be used to perform face-down ejection. Face-down ejection refers to the operation of ejecting a sheet with the image formed side down in the case of single-sided printing. In the case of this embodiment, as shown in FIG. 1, a second switching flap 174 is provided on the upstream side of the reversing entrance roller 172, and when face-down ejection is performed, the sheet flipped by the reversing mechanism 200 is guided by the second switching flap 174 to the ejection roller pair 171.

Reversing and Retraction Portion

Next, the reversing and retraction portion 300 as the retraction portion of this embodiment using FIGS. 2 through 6 is described.

Figure 6:
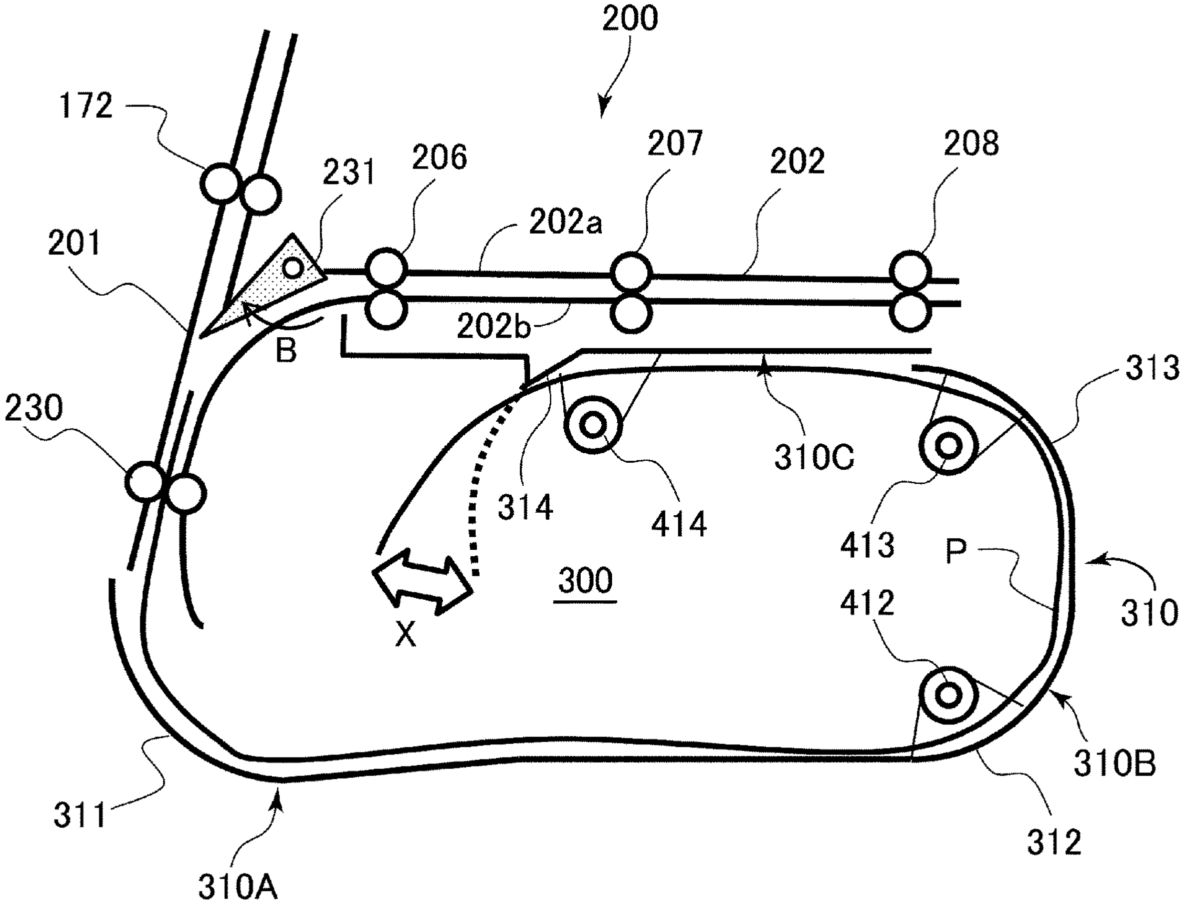
FIG. 6 is a view showing the flapping of the sheet tip during the reversal of the sheet by the reversing mechanism of the first embodiment.

FIG. 6 shows the flapping of the tip of the sheet during the reversing operation of the sheet by the reversing mechanism 200.

The reversing and retraction portion 300 is composed of guide member 310 arranged to surround the retreat area where the sheet fed from the reversing roller pair 230 is retreated. The guide member 310 forms a retraction feeding path in which the tip of the sheet is guided to trace the inner surface when the sheet is fed to be retreated to the retreat area, that is, it is located on only one side of the retraction feeding path. Therefore, except for the portions where the first to third opposing rollers 412, 413, 414 described below are located, the sheet swings with its first side on only one side of the retraction feeding path, and the sheet is configured so that the feeding resistance is smaller than when, for example, guide members are located on both sides of the retraction feeding path.

The guide member 310, which is omitted and shown as a single unit in FIG. 2, is composed of three members arranged in order with respect to the forward direction A of the reversing roller pair 230: the first guide member 310A, the second guide member 310B, and the third guide member 310C. In particular, in order to retreat a longer sheet into the reversing and retraction portion 300, it is necessary to utilize the area below the lower guide 202*b* as a retreat area. For example, when a long sheet is to be retreated to the reversing and retraction portion 300, the tip of the sheet will be left over from the third curved portion 313. Therefore, a third guide member 310C is placed below the lower guide 202*b* to provide a guide surface for guiding the sheet further ahead from the third curved portion 313.

The first guide member 310A has a first curved portion 311 formed, the second guide member 310B has a second curved portion 312 and a third curved portion 313 formed, and the third guide member 310C has a fourth curved portion 314 formed. This fourth curved portion 314 is formed by bending the lower surface of the third guide member 310C to form two flat surfaces, and is referred to in this embodiment as the fourth curved portion 314. As described above, the guide member 310 has a first curved portion 311, a second curved portion 312, a third curved portion 313, and a fourth curved portion 314 in order of proximity from the reversing roller pair 230 with respect to the forward feeding direction A of the reversing roller pair 230.

The tip of the sheet P fed from the reversing roller pair 230 to the reversing and retraction portion 300 is guided in contact with the first curved portion 311, the second curved portion 312, the third curved portion 313, and the fourth curved portion 314 when the sheet P is a long sheet. Specifically, the leading edge of the sheet P fed downward from the reversing roller pair 230 is guided by the first curved portion 311 in the direction from the upstream side to the downstream side of the sheet feeding direction in the double-sided feeding path 202 with respect to the horizontal direction (one direction in the horizontal direction). The tip of the sheet P is then guided in the direction from the upstream side to the downstream side of the sheet feeding direction in the double-sided feeding path 202. Further, the third curved portion 313 guides the tip of the sheet P horizontally to the opposite side of the sheet feeding direction in the double-sided feeding path 202 (the other direction in the horizontal direction). Then, the fourth curved portion 314 guides the sheet downward in the vertical direction. Therefore, when a relatively long sheet, such as the reversing roller pair 230, is switched back by the reversing and retraction portion 300, the sheet will be retreated in a rolled form along these curved portions inside the reversing and retraction portion 300 (see FIG. 4).

As shown in FIG. 2, a first opposing roller 412 as a first rotatable member in contact with the second surface of the sheet is arranged at a position opposite to the above second curved portion 312. The first opposing roller 412 is rotatably supported by a pair of support members 422 arranged on both sides of the outer side of the second guide member 310B in the width direction orthogonal to the sheet feeding direction, that is, the first opposing roller 412 is configured as a driven roller. The outer circumferential surface of the first opposing roller 412 is positioned by the support member 422 to be at least 5 mm away from the inner circumferential surface of the second curved portion 312. That is, the feeding path for feeding sheets in general (e.g., upstream feeding path 201 and double-sided feeding path 202) is configured so that the distance between the two guides is 3 mm to 5 mm. Therefore, the shortest distance between the outer circumference of the first opposing roller 412 and the inner circumference of the second curved portion 312 is configured to be at least 5 mm, which is more than the distance (3 mm to 5 mm) between the upper guide 202*a* and the lower guide 202*b*, for example.

The line connecting the center P1, which is the first center of the arc shape of the second curved portion 312, and the upstream end 312*a* of the second curved portion 312 in the forward direction A, when viewed from the width direction, is the first virtual line L1. Furthermore, when viewed from the width direction, the line connecting the arc-shaped center P1 of the second curved portion 312 and the downstream end 312*b* of the second curved portion 312 in the forward direction A is the second virtual line L2. At this time, the first opposing roller 412 fits within the area surrounded by the first virtual line L1, the second virtual line L2, and the arc of the second curved portion 312 when viewed from the width direction. In other words, the first opposing roller 412 does not face the entire opposing area from the second curved portion 312 to the center P1, but only a part of it.

Similarly, a second opposing roller 413 as a second rotatable member in contact with the second surface of the sheet is arranged at a position opposite to the third curved portion 313 above. The second opposing roller 413 is rotatable and is supported by a pair of support members 423 arranged on both sides of the outer side of the second guide member 310B in the width direction of the sheet, that is, the second opposing roller 413 is configured as a driven roller. In addition, the outer circumferential surface of the second opposing roller 413 is arranged by the supporting member 423 to be separated from the inner circumferential surface of the third curved portion 313 by 5 mm or more. Similarly, the shortest distance between the outer circumferential surface of the second opposing roller 413 and the inner circumferential surface of the third curved portion 313 is configured to be 5 mm or more, for example, more than the distance (3 mm to 5 mm) between the upper guide 202*a* and the lower guide 202*b*.

The line connecting the center P2, which is the second center of the arc shape of the third curved portion 313, and the upstream end 313*a* of the third curved portion 313 in the forward direction A when viewed from the width direction is the third virtual line L3. Furthermore, the line connecting the arc-shaped center P2 of the third curved portion 313 and the downstream end 313*b* of the third curved portion 313 in the forward direction A when viewed from the width direction is the fourth virtual line L4. At this time, the second opposing roller 413 fits within the area surrounded by the third virtual line L3, the fourth virtual line L4, and the arc of the third curved portion 313 when viewed from the width direction. In other words, the second opposing roller 413 does not face the entire opposing area from the third curved portion 313 to the center P2, but faces it partially.

A third opposing roller 414 as a third rotatable member in contact with the second surface of the sheet is arranged at a position opposite to the fourth curved portion 314 above. The third opposing roller 414 is rotatable and is supported by a pair of support members 424 arranged on both sides outside the third guide member 310C in the width direction of the sheet, that is, the third opposing roller 414 comprises a driven roller. In addition, the outer circumferential surface of the third opposing roller 414 is positioned by the support members 424 to be more than 5 mm away from the inner surface of the fourth curved portion 314. In short, the shortest distance between the outer circumferential surface of the third opposing roller 414 and the inner circumferential surface of the fourth curved portion 314 is configured to be 5 mm or more, for example, more than the distance (3 mm to 5 mm) between the upper guide 202*a* and the lower guide 202*b*. In addition, the first rotatable member, second rotatable member, and third rotatable member are plural in the width direction of the sheet, respectively. In this embodiment, there are four of them in the sheet width direction, and they are provided so that they can be easily rotated by contacting the sheet being fed.

Next, a detailed operation in the case where the long sheet is retreated to the retraction portion 300 and reversed and fed is described. As shown in FIG. 3, when a long sheet P is fed from the reversing roller pair 230 in the forward direction A to the reversing and retraction portion 300 and is retreated, it is guided along the inner surface of the guide member 310. In other words, the tip of the sheet P is guided by the first curved portion 311, the second curved portion 312, the third curved portion 313, and the fourth curved portion 314, and arrives at the reversing time in the state shown in FIG. 4. As mentioned above, the first opposing roller 412, the second opposing roller 413, and the third opposing roller 414 are separated respectively from the second curved portion 312, the third curved portion 313, and the fourth curved portion 314 by at least 5 mm or more. Therefore, the sheet P fed in the forward direction A does not easily contact the first opposing roller 412, the second opposing roller 413, and the third opposing roller 414, and is fed stably.

As described above, the first opposing roller 412 is partially opposed to the second curved portion 312, and the second opposing roller 413 is also partially opposed to the third curved portion 313. Therefore, even if the sheet P is nipped between the guide member 310 and the sheet P when it is fed in the forward direction A, the feeding resistance is reduced, and even if the sheet P jams, the jam handling and visibility are also improved.

Then, as shown in FIG. 4, when the sheet P is reversed, the reversing roller pair 230 is stopped by the above-mentioned printer controller 103*b*, and the double-sided switching flap 231 is switched in the direction of arrow B. Thereafter, the reversing roller pair 230 is reversed and the sheet P is fed in the reverse feeding direction C.

Figure 8:
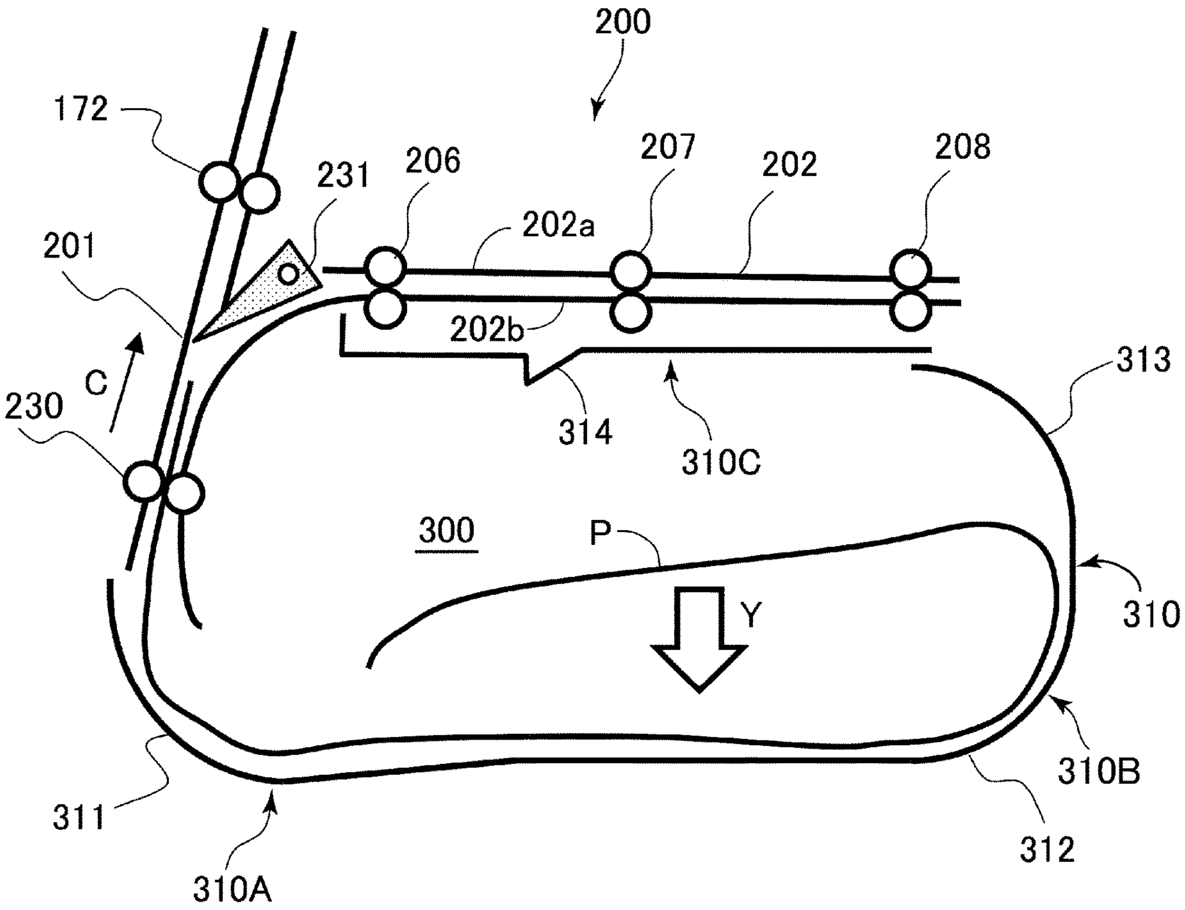
FIG. 8 is a view showing the state of the sheet at the time of reversal of the reversing operation by the reversing mechanism without the first and third rotatable members.
Figure 9:
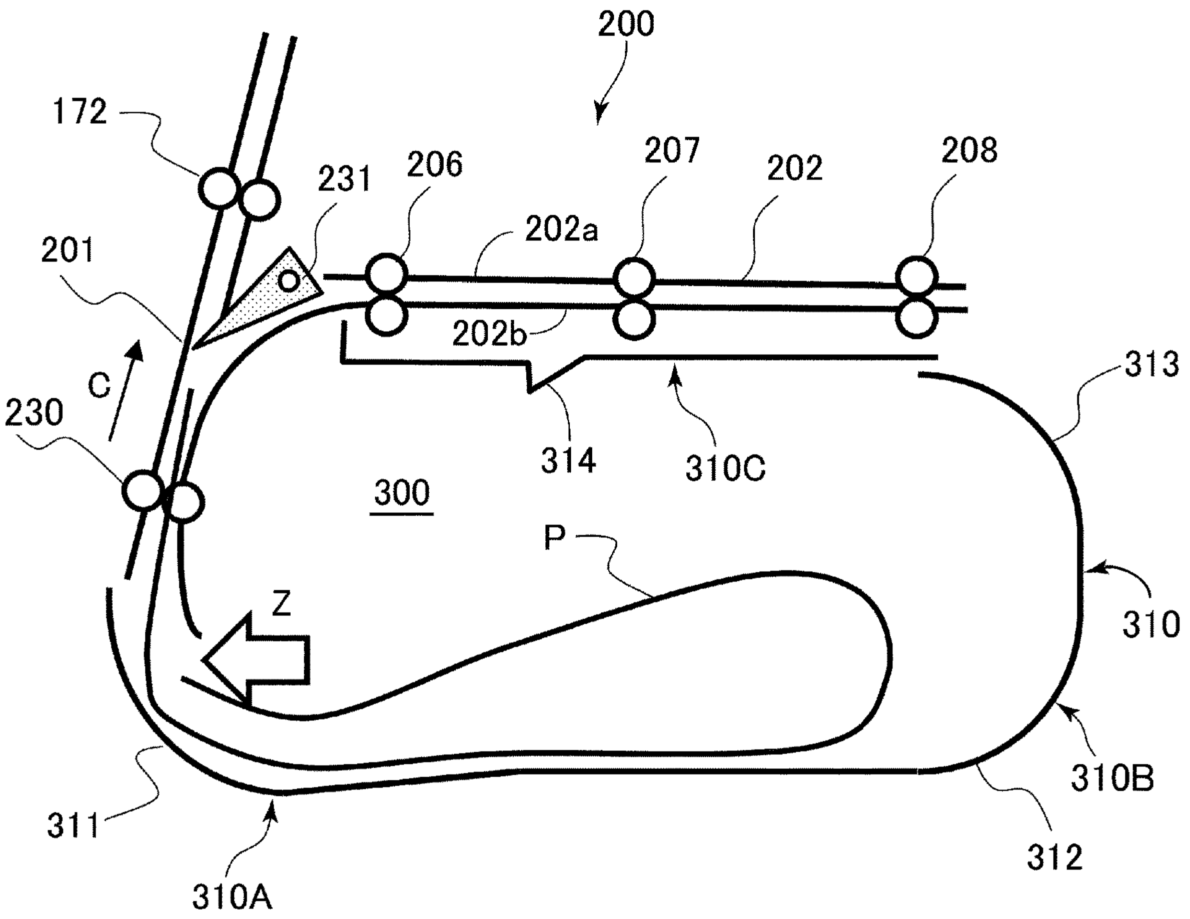
FIG. 9 is a view showing the state after the reversal of the sheet by the reversing mechanism without the first and third rotatable members.

Here, when the reversing roller pair 230 is stopped, there is no feeding force on the sheet P to trace the guide member 310. For example, as shown in FIG. 8, if the first opposing roller 412, the second opposing roller 413, and the third opposing roller 414 are not provided, the sheet P will hang downward as shown by the direction of arrow Y, and the sheet P will buckle and fall downward. In this state, when the rotation of the reversing roller pair 230 is reversed and the sheet P is fed in the reverse feeding direction C, the tip of the sheet P is pulled into the reversing roller pair 230 in the direction of arrow Z, as shown in FIG. 9.

Figure 10:
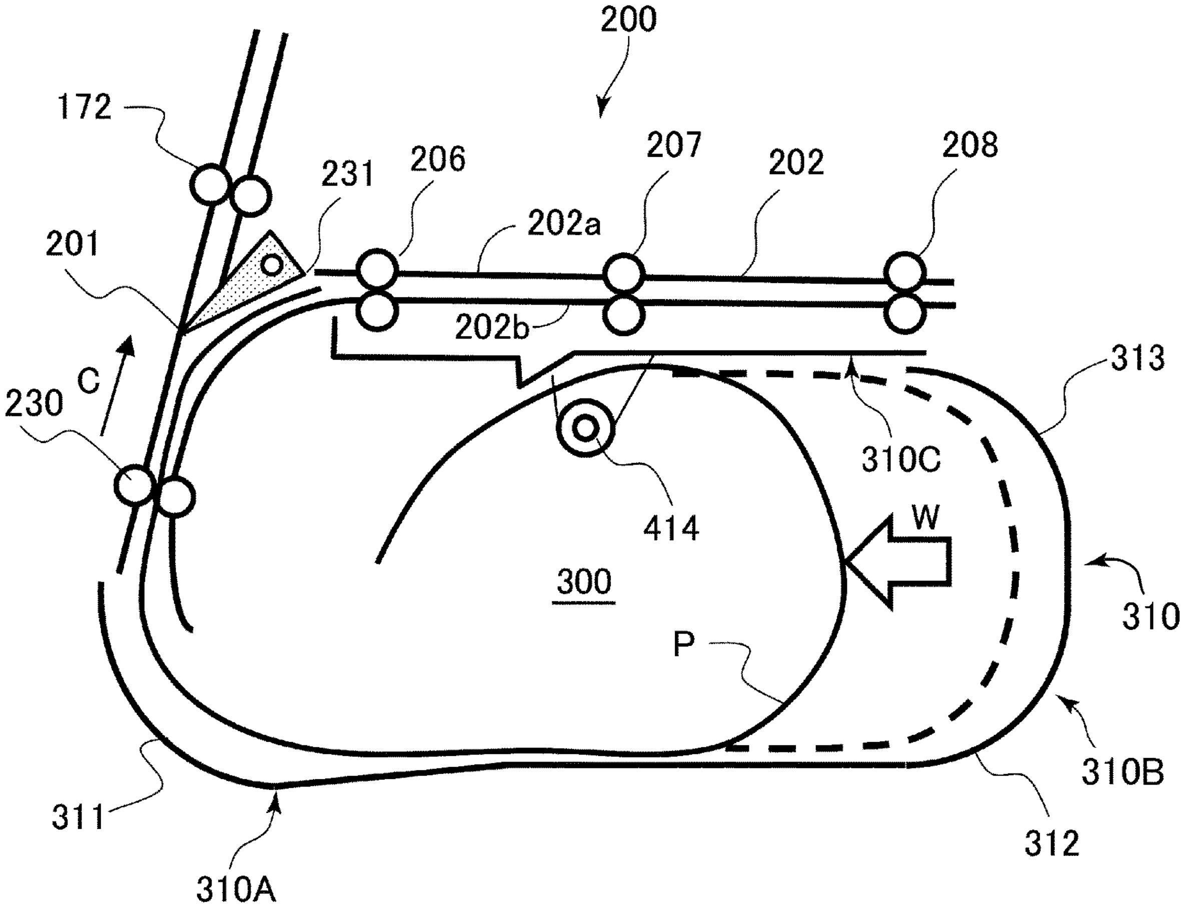
FIG. 10 is a view showing the state after reversing the sheet by the reversing mechanism without the first and second rotatable members.

For example, suppose that the first opposing roller 412 and the second opposing roller 413 are not provided, and only the third opposing roller 414 is provided, as shown in FIG. 10. Even in this case, when the rotation of the reversing roller pair 230 is reversed and the sheet P is fed in the reverse feeding direction C, the sheet P is rolled in the direction of the arrow W, and the tip of the sheet P may fall downward. If this happens, the load on the reversing roller pair 230 may fluctuate or the sheet may be pulled into the reversing roller pair 230. In particular, if the load fluctuation becomes large, the torque of the motor that drives the reversing roller pair 230 becomes large, or the reversing roller pair 230 may not be able to hold the sheet. In addition, increasing the gripping force of the reversing roller pair 230 causes problems such as the need to increase the motor torque, image damage caused by roller marks, and decreased durability.

Therefore, in this embodiment, as shown in FIG. 5, the first opposing roller 412, the second opposing roller 413, and the third opposing roller 414 are provided, and the sheet P is supported against the inside by these rollers to maintain the shape of the sheet P along the inside of the guide member 310. This prevents the long sheet P from hanging downward during or after reversing the sheet P, and prevents the sheet P from folding, also preventing load fluctuation to the reversing roller pair 230, and pulling the tip of the sheet P into the reversing roller pair 230.

By the way, when the length of a long sheet P is normal (first length, third length), such as A3 size or 18 inches or less, it does not reach the third curved portion 313. However, if the length of the sheet P is longer than the normal length (second length, fourth length), it will reach the fourth curved portion 314 beyond the third curved portion 313. When the length reaches the fourth curved portion 314, the tip of the sheet P, which is bent horizontally by the third curved portion 313 and bent downward by the fourth curved portion 314, tends to flap against the direction of the arrow X, as shown in FIG. 6.

Therefore, when the sheet P is a long sheet with a length (fourth length) to be longer than the above normal length (third length), the printer controller 103*b* above sets the stopping time (first stopping time) before reversing the rotation longer than the normal time (second stopping time). This prevents the sheet P from being reversed until the flapping at the tip of the sheet P stops, and thereafter enables stable feeding of the reversed sheet P and reduces the fluctuation of the feeding load.

Furthermore, when the sheet P is a long sheet with a length (second length) longer than the above normal length (first length), the printer controller 103*b* above sets the feeding speed after reversing the reversing roller pair 230 and its acceleration to ½ of that for the normal length. In other words, when the sheet is a normal length sheet, it is controlled by the normal feeding speed (the first feeding speed) and acceleration (the first acceleration). Then, if the sheet is longer than the normal length, such as A3 size or 18 inches or less, it is controlled at a slower feeding speed (the second feeding speed) and acceleration (the second acceleration) than the normal feeding speed and acceleration. This reduces the effects of inertia caused by the weight, friction, and shape of the long sheet P.

SECOND EMBODIMENT

Figure 7:
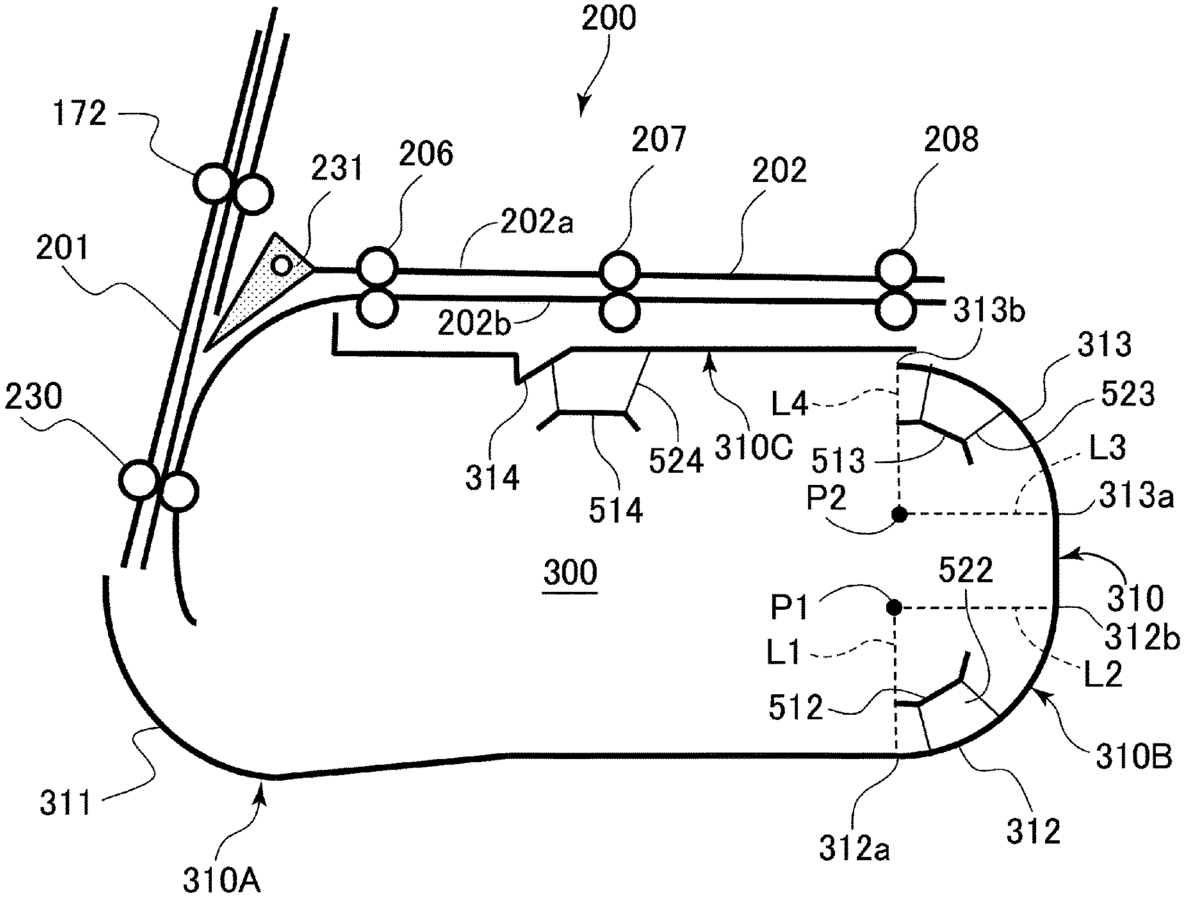
FIG. 7 is a schematic view of the reversing mechanism for the second embodiment.

Next, the second embodiment, which is a partial modification of the first embodiment above, is described using FIG. 7. FIG. 7 shows a schematic view of the reversing mechanism of the second embodiment. In the explanation of the second embodiment, the same sign is used for the same parts as in the first embodiment, and the explanation is omitted.

In the first embodiment, the first opposed roller 412, the second opposed roller 413, and the third opposed roller 414 are provided, but in the second embodiment, as shown in FIG. 7, these are provided in the form of a plate having an opposing surface facing the guide member 310. That is, the second curved portion 312 is arranged so that the first opposing surface 512 faces the guide member 310, the third curved portion 313 is arranged so that the second opposing surface 513 faces the guide member 310, and the fourth curved portion 314 is arranged so that the third opposing surface 514 faces the guide member 310.

In detail, the first opposing surface 512 as the first tangential member is arranged at the position opposite to the second curved portion 312 above. The first opposing surface 512 is supported by a pair of support members 522 arranged on both sides of the outer side of the second guide member 310B in the width direction of the sheet. The outer surface of the first opposing surface 512 is arranged by the support members 522 to be more than 5 mm away from the inner surface of the second curved portion 312. That is, the shortest distance between the outer surface of the first opposing surface 512 and the inner circumference of the second curved portion 312 is configured to be 5 mm or more, which is more than, for example, the distance (3 mm to 5 mm) between the upper surface guide 202*a* and the lower surface guide 202*b*.

The first opposing surface 512 is contained within the area surrounded by the first virtual line L1, the second virtual line L2 and the arc of the second curved portion 312 when viewed from the width direction. In other words, the first opposing surface 512 does not face the whole of the opposing area from the second curved portion 312 to the center P1, but faces it partially.

Similarly, the second opposing surface 513 as the second tangential member is arranged at the position opposite to the third curved portion 313 above. The second opposing surface 513 is supported by a pair of support members 523 arranged on both sides outside the second guide member 310B in the sheet width direction. The outer surface of the second opposing surface 513 is arranged by the support member 523 to be more than 5 mm away from the inner surface of the third curved portion 313. That is, the shortest distance between the outer surface of the second opposing surface 513 and the inner circumference of the third curved portion 313 is configured to be 5 mm or more, which is more than the distance (3 mm to 5 mm) between the upper surface guide 202*a* and the lower surface guide 202*b*, for example.

The second opposing surface 513 is contained within the area surrounded by the third virtual line L3, the fourth virtual line L4 and the arc of the third curved portion 313 when viewed from the width direction. In other words, the second opposing surface 513 does not face the entire opposing area from the third curved portion 313 to the center P2, but only a part of it.

The third opposing surface 514 as the third tangential member is arranged at the position opposite the fourth curved portion 314 above. The third opposing surface 514 is supported by a pair of support members 524 arranged on both sides of the outside of the third guide member 310C in the sheet width direction. The support members 524 cause the outer surface of the third opposing surface 514 to be placed at least 5 mm away from the inner surface of the fourth curved portion 314. That is, the shortest distance between the outer surface of the third opposing surface 514 and the inner surface of the fourth curved portion 314 is configured to be 5 mm or more, for example, more than the distance (3 mm to 5 mm) between the top guide 202*a* and the bottom guide 202*b*.

In the reversing and retraction portion 300 of the second embodiment configured as described above, the shape of the sheet P is maintained by the first opposing surface 512, the second opposing surface 513 and the third opposing surface 514 during or after reversing the sheet P. This prevents the sheet P from falling over or pulling the tip of the sheet P into the reversing roller pair 230, reduces the fluctuation of the feeding load, and enables stable feeding.

The other configurations, actions and effects of the second embodiment are the same as those of the first embodiment, so their explanation is omitted.

Possibility of Other Embodiments

In the first and second embodiments described above, the reversing and retraction portion 300 was described as being positioned on the lower side of the printer 100 in line with the storage compartment 110*a*. However, it is not limited to this positioning, thus the reversing and retraction portion 300 may be located anywhere inside the printer 100.

In the first and second embodiments, it was described that the guide member 310 is composed of a first curved portion 311, a second curved portion 312, a third curved portion 313, and a fourth curved portion 314 with a first guide member 310A, a second guide member 310B, and a third guide member 310C. However, this is not limited to the case where, for example, the guide member 310 is composed of a single piece or can be divided in any way.

In the second embodiment, it has been explained that the first opposing surface 512, the second opposing surface 513, and the third opposing surface 514 are surface-like. However, this is not limited to this, and it is also possible to provide feeding ribs on the surface corresponding to the guide member 310, or to arrange a plurality of small rollers.

In the first and second embodiments, the first through third curved portions 311-313 were described as being formed by arcuate curved surfaces viewed from the width direction. However, it is not limited to these, and the first through third curved portions can be made of a plurality of flat surfaces connected at different angles, that is, as long as the feeding path is curved. Conversely, the fourth curved portion 314 connects two flat surfaces and the feeding path is curved. However, this is not limited to the case where the fourth curved portion is formed by an arc-shaped curved surface when viewed from the width direction, i.e., as long as the feeding path is curved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-115350 filed on Jul. 3, 2020, which is hereby incorporated by reference herein in its entirety.

What is claimed is:

1. A sheet feeding device comprising:

a reversing roller configured to reverse a sheet by feeding the sheet with respect to a first direction and then feeding the sheet with respect to a second direction opposite to the first direction;

a guide member including a curved portion to curve inside a first surface of the sheet and configured to guide the sheet along said curved portion in contact with a second surface opposite to the first surface of the sheet fed by said reversing roller with respect to the first direction; and a rotatable member disposed to be opposed to a sheet guide surface in said curved portion with a gap and configured to be rotated by contacting with the first surface of the sheet fed by said reversing roller, wherein when the sheet is fed by said reversing roller with respect to the second direction, said rotatable member is rotated by contact of the first surface of the sheet with said rotatable member.

2. A sheet feeding device according to claim 1, wherein said sheet feeding device includes no rotatable member disposed to be opposed to said sheet guide surface in said curved portion and configured to be rotated by contacting with the second surface of the sheet.

3. A sheet feeding device according to claim 1, wherein said guide member includes:

a first curved guide portion provided under said reversing roller with respect to a vertical direction and configured to guide a leading end of the sheet with respect to one direction of substantially horizontal directions;

a second curved guide portion provided at a position different from said first curved guide portion with respect to the horizontal direction and configured to guide the leading end of the sheet from the substantially horizontal direction to upward with respect to the vertical directions; and a third curved guide portion provided over said second curved guide portion with respect to the vertical direction and configured to guide the leading end of the sheet from upward with respect to the vertical direction to the other direction of the substantially horizontal direction, wherein said rotatable member includes a first rotatable member disposed to be opposed to a feeding surface in said third curved portion with a gap, and wherein when the sheet is fed by said reversing roller with respect to the first direction, the first surface of the sheet is supported by contact of said first rotatable member, and then, when the sheet is fed by said reversing roller with respect to the second direction, said first rotatable member is rotated by contact of the first surface of the sheet with said first rotatable member.

4. A sheet feeding device according to claim 3, wherein said rotatable member includes a second rotatable member disposed to be opposed to a feeding surface in said second curved portion with a gap, and wherein when the sheet is fed by said reversing roller with respect to the second direction, said second rotatable member is rotated by contact of the first surface of the sheet with said second rotatable member.

5. A sheet feeding device according to claim 4, wherein both a distance of the gap between the feeding surface of said second curved portion and said second rotatable member, and a distance of the gap between the feeding surface of said third curved portion and said first rotatable member are 5 mm or more.

6. A sheet feeding device according to claim 4, wherein both a distance of the gap between the feeding surface of said second curved portion and said second rotatable member, and a distance of the gap between the feeding surface of said third curved portion and said first rotatable member are greater than a thickness of the sheet.

7. A sheet feeding device according to claim 4, wherein as seen in a widthwise direction of the sheet perpendicular to a feeding direction of the sheet, said second curved guide portion is formed in an arc shape about a first center, wherein as seen in the widthwise direction of the sheet, said third curved guide portion is formed in an arc shape about a second center different from the first center, wherein as seen in the widthwise direction of the sheet, said first rotatable member is disposed between a first imaginary line connecting an upstream end of said second curved guide portion with respect to the first direction and the first center, and a second imaginary line connecting a downstream end of said second curved guide portion with respect to the first direction and the first center, and wherein as seen in the widthwise direction of the sheet, said second rotatable member is disposed between a third imaginary line connecting an upstream end of said third curved guide portion with respect to the first direction and the second center, and a fourth imaginary line connecting a downstream end of said third curved guide portion with respect to the first direction and the second center.

8. A sheet feeding device according to claim 1, wherein said rotatable member includes a driven roller.

9. A sheet feeding device according to claim 3, wherein said guide member includes a fourth guide portion provided at a position different from said third curved guide portion with respect to the horizontal direction and configured to guide the leading end of the sheet from the other direction of the substantially horizontal direction to downward with respect to the vertical direction, and wherein said rotatable member includes another rotatable member disposed to be opposed to a feeding surface in said fourth guide portion with a gap and configured to be rotated by contacting with the first surface of the sheet fed by said reversing roller.

10. A sheet feeding device according to claim 1, further comprising a control portion configured to control a driving of said reversing roller, wherein said control portion is capable of controlling a feeding speed of the sheet and an acceleration for accelerating the sheet to the feeding speed from a state in which the sheet is stopped, wherein said control portion controls said reversing roller at a first feeding speed and a first acceleration in a case in which the sheet has a first length with respect to the first direction, and wherein said control portion controls said reversing roller at a second feeding speed slower than the first feeding speed and a second acceleration smaller than the first acceleration in a case in which the sheet has a second length longer than the first length with respect to the first direction.

11. A sheet feeding device according to claim 10, wherein the first length is a length for the leading end of the sheet with respect to the first direction not reaching said third curved guide portion when the feeding direction of the sheet is reversed from the first direction to the second direction, and wherein the second length is a length for the leading end of the sheet with respect to the first direction reaching said third curved guide portion when the feeding direction of the sheet is reversed from the first direction to the second direction.

12. A sheet feeding device according to claim 10, wherein said control portion controls said reversing roller to stop feeding of the sheet for a stop time when the feeding direction of the sheet is reversed from the first direction to the second direction, and wherein the feeding of the sheet is stopped for a first stop time in a case in which the sheet has a third length with respect to the first direction, and the feeding of the sheet is stopped for a second stop time longer than the first stop time in a case in which the sheet has a fourth length longer than the third length with respect to the first direction.

13. A sheet feeding device according to claim 12, wherein the third length is a length for the leading end of the sheet with respect to the first direction not reaching said third curved guide portion when the feeding direction of the sheet is reversed from the first direction to the second direction, and wherein the fourth length is a length for the leading end of the sheet with respect to the first direction reaching said third curved guide portion when the feeding direction of the sheet is reversed from the first direction to the second direction.

14. A sheet feeding device according to claim 1, wherein said rotatable member includes a plurality of rollers provided in the widthwise direction of the sheet perpendicular to the feeding direction.

15. An image forming apparatus comprising:

an image forming device configured to form an image on a sheet; and a sheet feeding device according to claim 1, said sheet feeding device being configured to feed the sheet on which the image is formed by said image forming device.

16. A sheet feeding device according to claim 9, wherein said fourth guide portion comprises two flat surfaces at an angle to each other.

* * * * *